March 19, 1968   A. HEYKOOP ET AL   3,374,272
HYDROGENATION OF MESITYL OXIDE
Filed March 9, 1966
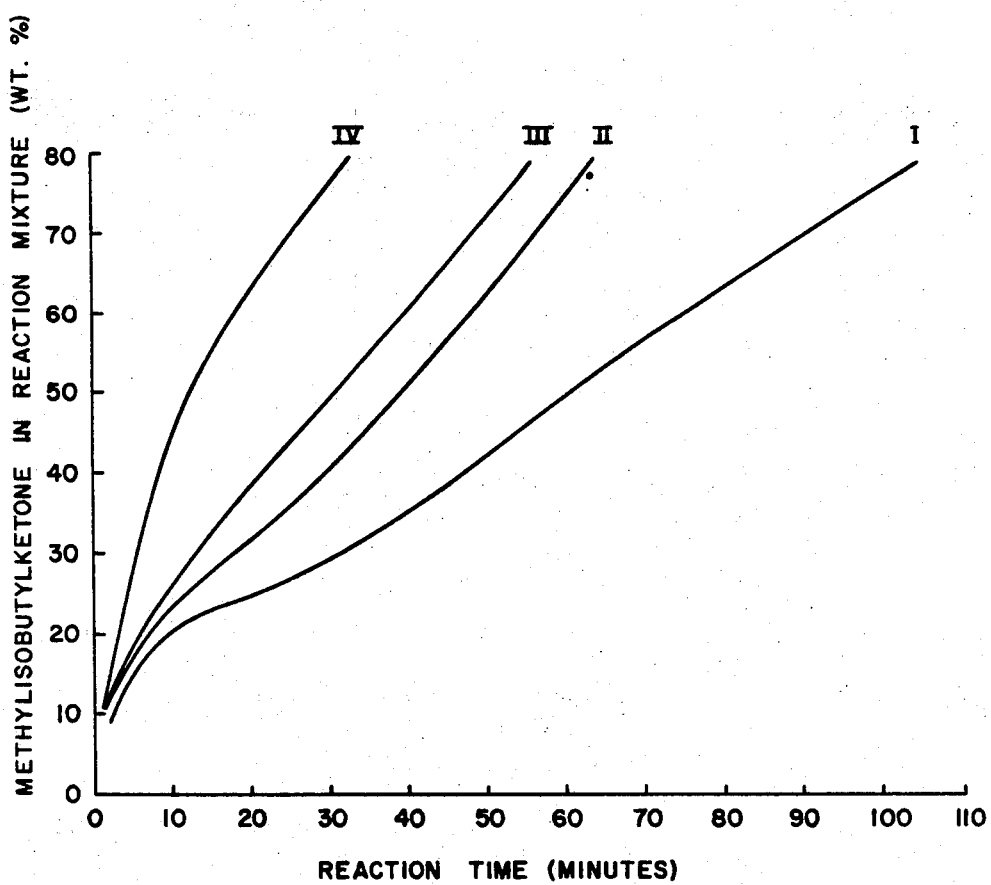
INVENTORS:
ADOLF HEYKOOP
FRANCISCUS A. VAN DIJK
BY: Millard L. Caldwell
THEIR ATTORNEY 3,374,272
HYDROGENATION OF MESITYL OXIDE
Adolf Heykoop and Franciscus A. van Dijk, Rotterdam, Netherlands, assignors to Shell Oil Company, New York, N.Y., a corporation of Delaware
Filed Mar. 9, 1966, Ser. No. 532,973
Claims priority, application Netherlands, Mar. 18, 1965, 65—3,470
8 Claims. (Cl. 260—593)

ABSTRACT OF THE DISCLOSURE

Crude mesityl oxide, obtained by dehydrogenating diacetone alcohol with sulfuric acid, is treated with hydrogen peroxide and caustic before liquid phase hydrogenation in the presence of a nickel catalyst such as Raney nickel to methyl isobutyl ketone and/or methyl isobutyl carbinol.

---

This invention relates to a process for the preparation of methyl isobutyl ketone and/or methyl isobutyl carbinol by catalytic hydrogenation of mesityl oxide. It deals with a new method of operation whereby this hydrogenation can be carried out more efficiently and economically than by the previous methods.

Methyl isobutyl ketone and methyl isobutyl carbinol are produced commercially on a relatively large scale by (1) condensing acetone to diacetone alcohol, (2) dehydrating the diacetone alcohol to mesityl oxide, and (3) hydrogenating the mesityl oxide. U.S. Patent 1,965,829, for example, describes this series of reactions. Another advantageous method of carrying out the condensation step is disclosed in U.S. Patent 2,130,592. The dehydration of the diacetone alcohol can be achieved in various ways. U.S. Patent 2,139,630 describes one useful procedure in which different types of acidic catalysts can be advantageously used. The condensation of the acetone can also be conducted in such a way that mesityl oxide and diacetone alcohol are formed simultaneously (vide U.K. patent specification 794,344, for example). The reaction product is treated with acid in order to convert the diacetone alcohol present therein into mesityl oxide. The mesityl oxide thus produced is also useful as starting material for the present invention, and the disclosures of foregoing patents are incorporated herein by reference as regards their teachings of methods of producing mesityl oxide suitable for use in the process of the invention. However, the process of the invention is especially effective in liquid phase hydrogenation of crude mesityl oxide obtained by dehydration of diacetone alcohol using sulfuric acid as the dehydrogenation catalyst, and this application of the invention will be emphasized in the following discussion of the new process, but only for the sake of simplifying the description and without any intention of restricting the invention.

In producing mesityl oxide for use in the process of the invention it is possible first to separate the unconverted acetone from the diacetone alcohol and then to carry out the dehydration with sulfuric acid, but this is not necessary. It is also possible to subject the whole reaction mixture containing acetone and diacetone alcohol (and possibly already mesityl oxide) to the sulfuric acid treatment and to separate the mixture by means of distillation. In any case the dehydration can very suitably be carried out by distillation in the presence of sulfuric acid. This can be effected by a wide variety of special ways, as can be seen from the U.K. patent specifications 881,918 and 795,228. Thus mesityl oxide is obtained which still contains some percentages of water and several other contaminants. In the present patent application this mesityl oxide will henceforth be called "crude mesityl oxide."

The crude mesityl oxide can be subjected, before the hydrogenation, to a further distillation in order to remove the water and other contaminants more or less completely. This involves extra expense and for this reason preference is given to hydrogenating the crude mesityl oxide as such.

A variety of hydrogenation catalysts can be used in converting the mesityl oxide to methyl isobutyl ketone and/or methyl isobutyl carbinol. Metal hydrogenation catalysts of the type disclosed in the previously mentioned U.S. Patent 1,965,829, for instance, are suitable. Particularly good results have been obtained with metallic nickel catalysts.

The hydrogenation may be carried out in the liquid phase or the gaseous phase. Hydrogenation in the liquid phase is a simpler process, since inter alia it is possible to operate at lower temperatures, the mesityl oxide does not need to be previously evaporated, and there is no need to recondense the reaction product after completion of the reaction. Applicants have discovered, however, that hydrogenation in the liquid phase has the drawback that the life of the catalyst is very short.

It has now been found that this drawback can be obviated by treating the crude mesityl oxide with hydrogen peroxide and inorganic base solution prior to the hydrogenation.

Any suitable inorganic base can be used in the treatment, but relatively strong inorganic bases such as aqueous caustic alkali solutions are particularly advantageous. Sodium or potassium hydroxides are examples of suitable caustic alkalis which can be used successfully, but the invention is not restricted to these inorganic bases.

The treatment with hydrogen peroxide and inorganic base solution can be carried out simply by adding an aqueous solution of hydrogen peroxide and base solution to the mesityl oxide. A good contact between the reagents can be ensured by stirring or other suitable measures.

The contact time does not need to be long; in most cases 10 seconds is quite sufficient. In practice, however, it is more convenient to work with longer contact times and there is no objection to this. There is generally no advantage in extending the time of treatment beyond about 30 minutes, however.

The hydrogen peroxide and the inorganic base solution can be added to the mesityl oxide in any given sequence, or simultaneously. In view of the comparatively low degree of stability of hydrogen peroxide in an alkaline medium it may be advisable first to admix the hydrogen peroxide well with the mesityl oxide and only then to add the inorganic base solution, in order to prevent unnecessary consumption of hydrogen peroxide.

The reaction may be carried out at room temperature, although there is no objection to using higher or lower temperatures. The operating temperature normally lies between about 5° and about 50° C.

The quantities of the reagents required are not large. They can, for example, be used in amounts, per liter of crude mesityl oxide, ranging from about 0.3 to about 1.0 ml. of hydrogen peroxide solution of 8% concentration and from about 0.3 to about 1.0 ml. of caustic alkali solution of 10% concentration, or in equivalent amounts of solutions of other concentrations. The concentrations of the solutions are not critical, in practice they are so chosen as to make it easy to proportion with the desired accuracy the small amounts of the reagents required. Hydrogen peroxide solutions of about 5 to about 15% w. concentration in water, and aqueous inorganic base solutions of about 5 to about 15% w. concentration are conveniently used.

After the treatment with hydrogen peroxide and inorganic base according to the invention, it is sufficient to separate the aqueous phase from the mesityl oxide in a simple manner, as, for instance, by decantation. Washing with water is possible but is not generally necessary.

If it is desired to produce methyl isobutyl ketone as the principal product the hydrogenation with nickel catalyst is carried out at approximately 80°–130° C. and at a pressure of approximately 10–13 atm. abs. If the preparation of methyl isobutyl carbinol is principally aimed at, higher temperatures and pressures, for example 150° C. and 26 atm. abs., are normally used with nickel catalysts. Raney nickel is preferably employed as nickel catalyst.

EXAMPLES

In all the experiments use was made of crude mesityl oxide obtained on an industrial scale by dehydration of diacetone alcohol effected by distillation in the presence of sulfuric acid. The resultant crude mesityl oxide had the following composition:

| | Percent by weight |
|---|---|
| Mesityl oxide | 85.5 |
| Water | 5.0 |
| Other components | 9.5 |

The other components were actone, diacetone alcohol, isopropyl alcohol, methyl isobutyl ketone and methyl isobutyl carbinol; the presence of the last three components was caused by recycle streams from other parts of the plant.

(a) *Laboratory experiments*

In a 0.5 l. stirred autoclave crude mesityl oxide was hydrogenated at a temperature of 80° C. under a constant hydrogen pressure of 10 atm. abs. As catalyst use was made of Raney nickel in a quantity of 10% by weight, based on the crude mesityl oxide. During the reaction samples of the reaction mixture were taken out of the autoclave at fixed intervals and the quantity of methyl isobutyl ketone in these samples was determined as a guide to the course of the reaction.

Four such experiments were carried out:

*Experiment I.*—In this experiment the crude mesityl oxide was used as starting material for the hydrogenation without any pre-treatment.

*Experiment II.*—In this experiment the crude mesityl oxide was first distilled and only the fraction boiling between 127° and 130° C. was used as starting material for the hydrogenation.

*Experiment III.*—The crude mesityl oxide was stirred at room temperature for 2 minutes with a caustic soda solution of 10% concentration in a quantity of 0.8 ml. per liter of crude mesityl oxide. The aqueous phase was then allowed to settle and was subsequently separated off. The remaining organic phase was used as starting material for the hydrogenation.

*Experiment IV.*—The crude mesityl oxide was pre-treated as in Experiment III except that in addition to the caustic soda solution a hydrogen peroxide solution of 8% concentration was also added in a quantity of 0.7 ml. per liter of crude mesityl crude.

The results of the experiments are presented in the accompanying graph. It can be seen clearly that a pre-treatment with hydrogen peroxide and inorganic base solution according to the invention (Experiment IV) gives a considerable improvement while a much lesser degree of improvement is achieved by distillation (Experiment II) or by pre-treatment with caustic soda solution alone (Experiment III).

(b) *Experiments on a technical scale*

Crude mesityl oxide was continuously hydrogenated in a stirred reactor having a total capacity of 1200 liters. The liquid content of the reactor was kept constantly at 800 liters. At the beginning of the experiment a quantity of 60 kg. of Raney nickel was present as catalyst in the reactor. 500 liters per hour of crude mesityl oxide were introduced into the reactor and a similar quantity of product taken off. The reaction temperature was controlled between 75° C. and 130° C. and adjusted in such a way that the content of mesityl oxide in the product was below 1.5% by weight and the content of methyl isobutyl ketone was above 80% by weight. The pressure was maintained between 10 and 13 atm. abs.; a pressure difference within these limits has substantially no effect on the reaction rate. Each time that the reaction rate dropped excessively (shown by the reaching of the maximum limit of 1.5% by weight for the mesityl oxide content in the product) a portion of 20 kg. of fresh catalyst was added. Four of these experiments were carried out.

*Experiment V.*—In this experiment the crude mesityl oxide was used as starting material without any pre-treatment.

It was necessary to add fresh catalyst at intervals varying from 20 to 35 hours. After each addition of a portion of fresh catalyst, however, the composition of the product altered to the extent that the proportion of methyl isobutyl carbinol increased and the quantity of methyl isobutyl ketone decreased. In order to obviate this the temperature had to be reduced to 95° C. to be then increased gradually again to 130° C. in order to compensate for the reduction in the activity of the catalyst. A daily production of 7 metric tons of methyl isobutyl ketone could be achieved. Catalyst consumption was 3 kg. per metric ton of methyl isobutyl ketone produced. The composition of the product (based on the total product minus the water contents) varied between the following limits:

| | Percent by weight |
|---|---|
| Methyl isobutyl ketone | 84–87 |
| Methyl isobutyl carbinol | 1–6 |
| Mesityl oxide | 1–9 |
| Other components, approx. | 6 |

*Experiment VI.*—Experiment V was repeated with crude mesityl oxide which had been treated with 0.8 ml. of caustic solution of 10% concentration per liter of crude mesityl oxide. Contrary to the expectations based on the laboratory experiments described earlier, Experiment VI showed substantially no improvement on Experiment V.

*Experiment VII.*—In this experiment the crude mesityl oxide was first distilled and only the fraction boiling between 127° and 130° C. was used as starting material for the hydrogenation.

In this case it was possible to carry out the hydrogenation between 85° and 125° C. A daily production of 10 metric tons of methyl isobutyl ketone could be achieved. Catalyst consumption was 0.35 kg. per metric ton of methyl isobutyl ketone produced. The composition of the product based on the total product minus the water content varied between the following limits:

| | Percent by weight |
|---|---|
| Methyl isobutyl ketone | 94–96 |
| Methyl isobutyl carbinol | 1–4 |
| Mesityl oxide | 0.5–1.5 |
| Other components, approx. | 1 |

The following improvements on Experiment V were therefore achieved: much lower catalyst consumption; higher daily production; more constant reaction conditions; more constant composition of the product; higher conversion of mesityl oxide; higher selectivity in respect of methyl isobutyl ketone.

*Experiment VIII.*—In this experiment the starting material used was mesityl oxide which had been treated with 0.8 ml. of caustic soda solution of 10% concentration and 0.7 ml. of hydrogen peroxide solution of 8% concentration per liter of crude mesityl oxide. The caustic soda solution and the hydrogen peroxide solution were injected into a line through which the crude mesityl oxide flowed to a storage tank. In this tank the aqueous phase was able to settle; the separated aqueous phase was drained off at fixed intervals. The quantity of mesityl oxide required for the hydrogenation was drawn off from the tank.

In this case it was possible to carry out the hydrogenation at temperatures between 80° and 100° C. A daily production of 10 tons of methyl isobutyl ketone was achieved. Catalyst consumption was 0.15 kg. per metric ton of methyl isobutyl ketone produced. The composition of the product (based on the total product minus the water content) varied between the following limits:

| | Percent by weight |
|---|---|
| Methyl isobutyl ketone | 91.5–92.5 |
| Methyl isobutyl carbinol | 1–1.5 |
| Mesityl oxide | 0.5–1.5 |
| Other components, approx. | 6 |

The following improvements on Experiment VII were therefore achieved: lower catalyst consumption; lower reaction temperature; more constant composition of the product; higher selectivity in respect of methyl isobutyl ketone.

Similar improvements can be obtained when carrying out the hydrogenation for the production of methyl isobutyl carbinol as chief product. Still other variations can be made in the process of the invention which is not limited to the details of operation shown in the examples which have been given by way of illustration only.

We claim as our invention:

1. In a process for producing a member of the group consisting of methyl isobutyl ketone, methyl isobutyl carbinol, and mixtures thereof by liquid phase catalytic hydrogenation of mesityl oxide produced by dehydration of diacetone alcohol, the improvement of treating said mesityl oxide with aqueous hydrogen peroxide and inorganic base solution prior to said hydrogenation.

2. A process in accordance with claim 1 wherein the hydrogenation is carried out with a nickel-containing hydrogenation catalyst.

3. A process in accordance with claim 2 wherein the hydrogenation catalyst is Raney nickel.

4. A process in accordance with claim 2 wherein mesityl oxide produced by sulfuric acid-catalyzed dehydration of diacetone alcohol is treated with aqueous hydrogen peroxide and inorganic hydroxide at about 5° to about 50° C.

5. A process in accordance with claim 4 wherein said treatment is carried out at about room temperature.

6. A process in accordance with claim 4 wherein said treatment is carried out with between about 0.3 and about 1 ml. of hydrogen peroxide solution of about 5 to about 15% wt. concentration and about 0.3 to about 1 ml. of aqueous caustic alkali solution of about 5% to about 15% wt. concentration, per liter of crude mesityl oxide.

7. A process in accordance with claim 6 wherein said caustic alkali is sodium hydroxide.

8. A process in accordance with claim 6 wherein the time of said treatment is at least 10 seconds.

References Cited

UNITED STATES PATENTS 2,077,421    4/1937    Lazier _____ 260—593

DANIEL D. HORWITZ, *Primary Examiner.*